(12) United States Patent
Kim et al.

(10) Patent No.: US 12,472,819 B2
(45) Date of Patent: Nov. 18, 2025

(54) VEHICLE AND METHOD OF CONTROLLING THE SAME

(71) Applicant: HYUNDAI MOBIS CO., LTD., Seoul (KR)

(72) Inventors: Jae Joong Kim, Seoul (KR); Bo Young Park, Seongnam-si (KR); Young Ji Hwang, Seoul (KR); Sang Il Chung, Seongnam-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 190 days.

(21) Appl. No.: 18/229,431

(22) Filed: Aug. 2, 2023

(65) Prior Publication Data

US 2024/0042854 A1 Feb. 8, 2024

(30) Foreign Application Priority Data

Aug. 3, 2022 (KR) .................. 10-2022-0096938

(51) Int. Cl.
| | |
|---|---|
| *B60K 35/21* | (2024.01) |
| *B60J 5/06* | (2006.01) |
| *B60K 35/28* | (2024.01) |
| *B60K 35/29* | (2024.01) |
| *B60K 35/60* | (2024.01) |
| *E05F 15/73* | (2015.01) |

(52) U.S. Cl.
CPC ............... *B60K 35/21* (2024.01); *B60J 5/062* (2013.01); *E05F 15/73* (2015.01); *B60K 35/28* (2024.01); *B60K 35/29* (2024.01); *B60K 35/60* (2024.01); *B60K 2360/186* (2024.01); *B60K 2360/794* (2024.01); *B60K 2360/797* (2024.01); *E05F 2015/767* (2015.01)

(58) Field of Classification Search
CPC .. B60K 35/00; B60K 2360/797; B60K 35/28; B60K 35/29; B60K 35/60; B60K 2360/186; B60K 2360/794; E05F 15/73; E05F 2015/767; B60J 5/062
See application file for complete search history.

(56) References Cited

U.S. PATENT DOCUMENTS

2022/0179432 A1* 6/2022 Nojoumian .............. B60N 2/28

* cited by examiner

*Primary Examiner* — Michael D Lang
(74) *Attorney, Agent, or Firm* — MORGAN, LEWIS & BOCKIUS LLP

(57) ABSTRACT

A vehicle includes a display, a mode setter determining a visual information provision target of an image displayed on the display according to a driving status and setting forward orientation of the image on the display according to the visual information provision target, and a display controller selecting an image corresponding to the driving status and displaying the image on the display after adjusting the forward orientation of the selected image to the inward direction, outward direction, or both directions of the display according to the forward orientation set by the mode setter.

20 Claims, 15 Drawing Sheets

VEHICLE AND METHOD OF CONTROLLING THE SAME

CROSS REFERENCE TO RELATED APPLICATION

The present application claims priority to Korean Patent Application No. 10-2022-0096938, filed Aug. 3, 2022, the entire contents of which is incorporated herein for all purposes by this reference.

TECHNICAL FIELD

The present disclosure relates a vehicle and a method of controlling the vehicle that selectively provides unidirectional or bidirectional visual information through a display based on driving status.

BACKGROUND

With recent advances in display technology, various types of display technology are being applied to vehicles. In particular, autonomous mobility offers greater flexibility in the placement position and form of display compared to conventional vehicles, and unmanned operation of autonomous mobility has brought out the need for communication through display. Here, autonomous mobility refers to various services or unmanned devices of transportation that contribute to an occupant's convenient move to a destination and encompasses autonomous vehicles, drones, eco-friendly bicycles, electric scooters, and car-sharing and ride-sharing services, among others.

Autonomous mobility may be provided with a transparent display as a device for exchanging information with other vehicles and pedestrians. In general, a transparent display provides unidirectional visual information by displaying images that external objects (other vehicles, pedestrians, waiting passengers, and the like) of autonomous mobility can perceive.

However, this approach does not reflect the information exchanges with the mobility's occupants based on the mobility's driving status, resulting in a problem of diminished communication capability between the mobility and its occupants.

The matters described above as background technology are intended to provide a better understanding of the background of the present disclosure and should not be considered as acknowledging that the present disclosure pertains to the prior art already known to those skilled in the art.

SUMMARY DISCLOSURE

The present disclosure is directed at the technical issue of selectively providing unidirectional or bidirectional visual information through a display based on the driving status.

The technical issues that the present disclosure intends to resolve are not limited to the technical issues mentioned above, and other issues not mentioned will be clearly understood by those skilled in the art to which the present disclosure pertains from the following description.

As a device to resolve the technical issue described above, a vehicle may include a display, a mode setter determining a visual information provision target of an image displayed on the display according to a driving status and setting the forward orientation of the image on the display according to the visual information provision target, and a display controller selecting an image corresponding to the driving status and displaying the image on the display after adjusting the forward orientation of the selected image to the inward direction, outward direction, or both directions of the display according to the forward orientation set by the mode setter.

Further, as a means to resolve the technical issue described above, a method of controlling a vehicle may include determining a driving status, determining a visual information provision target of an image displayed on a display according to the determined driving status, setting the forward orientation of the image on the display according to the determined visual information provision target, and displaying the image on the display after adjusting the forward orientation of the image to the inward direction, outward direction, or both directions according to the setting of the forward orientation.

According to the present disclosure, the communication capability between the occupant and external object, and mobility can be enhanced by selectively providing unidirectional or bidirectional visual information through a display based on the driving status.

Further, according to the present disclosure, the user experience (UX) for mobility may be enhanced by sensing the status of the occupants and an external object and communicating with the occupants and an external object through the display.

The effects obtainable from the present disclosure are not limited to the effects mentioned above, and other effects not mentioned will be clearly understood by those skilled in the art to which the present disclosure pertains from the following description.

DETAILED DESCRIPTION OF THE DISCLOSURE

Figure 1:
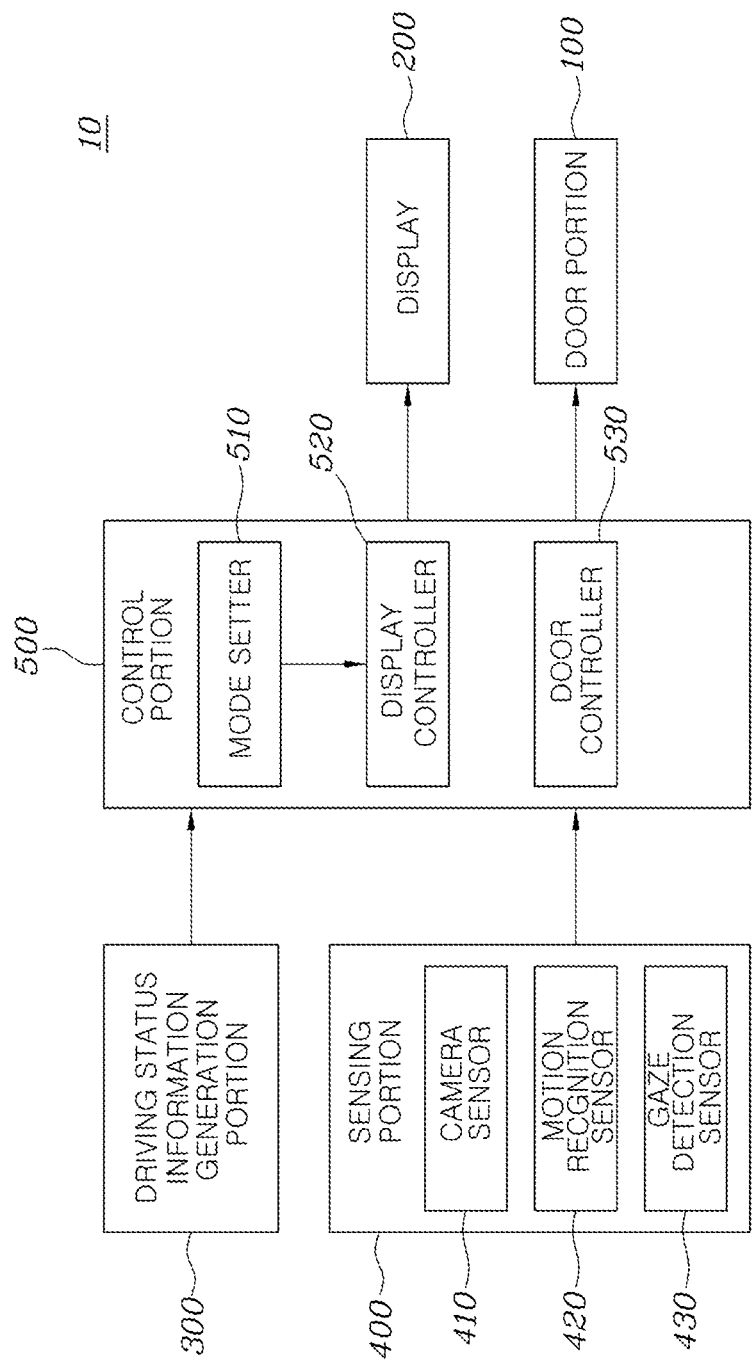
FIG. 1 is a block diagram illustrating a configuration of autonomous mobility according to an embodiment of the present disclosure.

The embodiments disclosed herein will be described in detail with reference to the accompanying drawings. However, the same or similar components will be given the same reference numerals regardless of the drawing numbers, and the repetitive descriptions regarding these components will be omitted.

When it is determined that the specific description of the related and already known technology may obscure the essence of the embodiments disclosed herein, the specific description will be omitted. Further, it is to be understood that the accompanying drawings are only intended to facilitate understanding of the embodiments disclosed herein and are not intended to limit the technical ideas disclosed herein are not limited to the accompanying drawings and include all the modifications, equivalents, or substitutions within the spirit and technical scope of the present disclosure.

The terms including ordinal numbers such as first, second, and the like may be used to describe various components, but the components are not to be limited by the terms. The terms may only be used for the purpose of distinguishing one component from another.

Singular expressions include plural expressions unless the context explicitly indicates otherwise.

In the present specification, terms such as "comprise" or "have" are intended to indicate the presence of implemented features, numbers, steps, manipulations, components, parts, or combinations thereof described in the specification and are not to be understood to preclude the presence or additional possibilities of one or more of other features, numbers, steps, manipulations, components, parts or combinations thereof.

In addition, a unit or a control unit included in the names is a term widely used in the naming of controllers that control specific functions of a vehicle and does not mean a generic function unit.

Embodiments of autonomous mobility will be described below, but the present disclosure is not limited thereto and may be implemented in conventional vehicles equipped with displays.

FIG. 1 is a block diagram illustrating a configuration of autonomous mobility 10 according to an embodiment of the present disclosure.

As illustrated in FIG. 1, autonomous mobility 10 may include a door portion 100, a display 200, a driving status information generation portion 300, a sensing portion 400, and a control portion 500.

The door portion 100 may be implemented as a side door positioned on one side of the autonomous mobility 10 and may form a space through which occupants of the mobility and the outside waiting passengers of the mobility can enter and exit when the door portion is in an open state.

The display 200 may be implemented as a transparent window display surrounded by a frame provided in the door portion 100 and provide user interface (UI) and graphic user interface (GUI) information by displaying text, static images, dynamic images, and 3D images. However, the positioning of the display 200 in the door portion 100 is just an illustrative example and the present disclosure is not necessarily limited thereto. For example, the display 200 may be disposed on a fixed window rather than the door portion 100, and thus the positioning of the display 200 may be set in various ways. The transparent window display is provided with a transparent film through which images are displayed using a light source (projector) provided in the autonomous mobility 10, and the transparent film may be implemented as radial fluorescent film, smart glass, microlens array diffuser, hologram film, and the like.

The driving status information generation portion 300 and the sensing portion 400 may output information about the driving situation and user status of the autonomous mobility 100 to the control portion 500 so that the control portion 500 controls the door portion 100 and the display 200.

The driving status information generation portion 300 may detect the driving situation of the autonomous mobility 10 and generate driving status information indicating various driving statuses such as the wait-for-boarding status of an external object (waiting passenger), the boarding process status of an external object (waiting passenger), the occupant's moving-to-destination status, the occupant's arrival schedule status, the occupant's arrival status, and the like. The driving situation may include the user's departure and destination locations, the driving route, the user's request for the autonomous mobility 10, and the like.

The sensing portion 400 may include a camera sensor 410 attached to the exterior of the autonomous mobility 10 and a motion recognition sensor 420 and a gaze detection sensor 430 attached to the interior of the autonomous mobility 10. The camera sensor 410 may be positioned at the outer upper end of the door portion 100 to measure the body temperature of a waiting passenger and the distance between the autonomous mobility 10 and the waiting passenger. The motion recognition sensor 420 may detect gestures of an occupant in the autonomous mobility 10, and the gaze detection sensor 430 may detect the gaze of an occupant of the autonomous mobility 10.

The control portion 500 may include a mode setter 510, a display controller 520, and a door controller 530.

The control portion 500 may provide unidirectional or bidirectional visual information to an occupant and an external object (other vehicles, pedestrians, waiting passengers, and the like) by adjusting the forward orientation of an image displayed on the display 200 to the inward direction, outward direction, or both directions of the display 200 according to the driving status.

Further, the control portion 500 may enhance the user experience (UX) of the mobility through bilateral communication by detecting the status of an occupant and an external object provided with visual information from the display 200 and controlling the opening status of the door portion 100 according to the detection results.

Each configuration of the control portion 500 will be described below.

The mode setter 510 may determine the driving status of the autonomous mobility 10 according to the driving status information and determine the visual information provision target of the image displayed on the display 200.

The visual information provision target may be at least one of the occupant and external objects (other vehicles, pedestrians, and waiting passengers, and the like) of the autonomous mobility 10.

For example, the mode setter 510 may determine the visual information provision target to be an external object when the driving status information indicates an outside waiting passenger's boarding process status and determine the visual information provision target to be an occupant of the autonomous mobility when the driving status information indicates the occupant's arrival schedule status or arrival status. Further, the mode setter 510 may determine the visual information provision target to be both a pedestrian and an external object when the driving status information indicates the occupant's moving-to-destination status.

Further, the mode setter 510 may set an image display mode for the display 200 to adjust the forward orientation of images to the inward direction, outward direction, or both directions according to the determined visual information provision target. The both directions may include the inward and outward directions.

According to the present embodiment, the image display mode may include the first to fourth display modes. Unidirectional visual information is provided to either an occupant or external object according to the driving status in the first and second display modes, while bidirectional visual information is provided to both an occupant and an external object according to the driving status in the third and fourth display modes.

More specifically, the mode setter 510 may set the forward orientation of the image to the outward direction of the display 200 by setting the image display mode to the first display mode when the visual information provision target is determined to be an external object. In contrast, the mode setter 510 may set the forward orientation of the image to the inward direction by setting the image display mode to the second display mode when the visual information provision target is determined to be an occupant.

Further, the mode setter 510 may set the image display mode to either the third or fourth display mode when the visual information provision target is determined to be both an occupant and an external object. The setting criteria of the third and fourth display modes may be set in various ways depending on embodiments.

More specifically, the forward orientation of image may be set to both directions of the display 200 in the third display mode, and the mode setter 510 may set the forward orientation of an image for a first region of the display 200 to the outward direction of the display 200 and set the forward orientation of an image for a second region of the display 200 to the inward direction of the display 200. The forward orientation of an image may be set to alternately switch between the outward and inward directions of the display 200 at predetermined time intervals.

The display controller 520 may select an image corresponding to the driving status and display the image on the display 200 after adjusting the forward orientation of the selected image to the inward direction, outward direction, or both directions of the display 200 according to the set image display mode.

The image selected based on the driving status may vary depending on embodiments and include boarding guidance information content, boarding process content, advertising content, driving situation information content, arrival notice information content, gesture interaction content, and the like.

For example, the display controller 520 may select an image that includes boarding process content when the driving status corresponds to the outside waiting passenger's boarding process status and select an image that includes gesture interaction content when the driving status corresponds to the occupant's arrival status.

The door controller 530 may manipulate the door portion 100 in a touchless manner by controlling the opening status of the door portion 100 based on the detection result of the sensing portion 200.

More specifically, when the driving status corresponds to the outside waiting passenger's boarding process status, the camera sensor 410 measures the body temperature of the outside waiting passenger provided with the visual information for boarding process content and the distance between the mobility and the outside waiting passenger, and the door controller 530 may control the door portion 100 in an open state when the body temperature of the outside waiting passenger is within a predetermined range and the distance to the mobility is within a predetermined safe range.

Further, when the driving status corresponds to the occupant's arrival status, the motion recognition sensor 420 and the gaze detection sensor 430 detect the gesture and gaze of the occupant provided with the visual information about the gesture interaction content, and the door controller 530 may control the door portion 100 in an open state according to the occupant's gesture recognized through the motion recognition sensor 420 and the occupant's gaze recognized through the gaze detection sensor 430.

Figure 2:
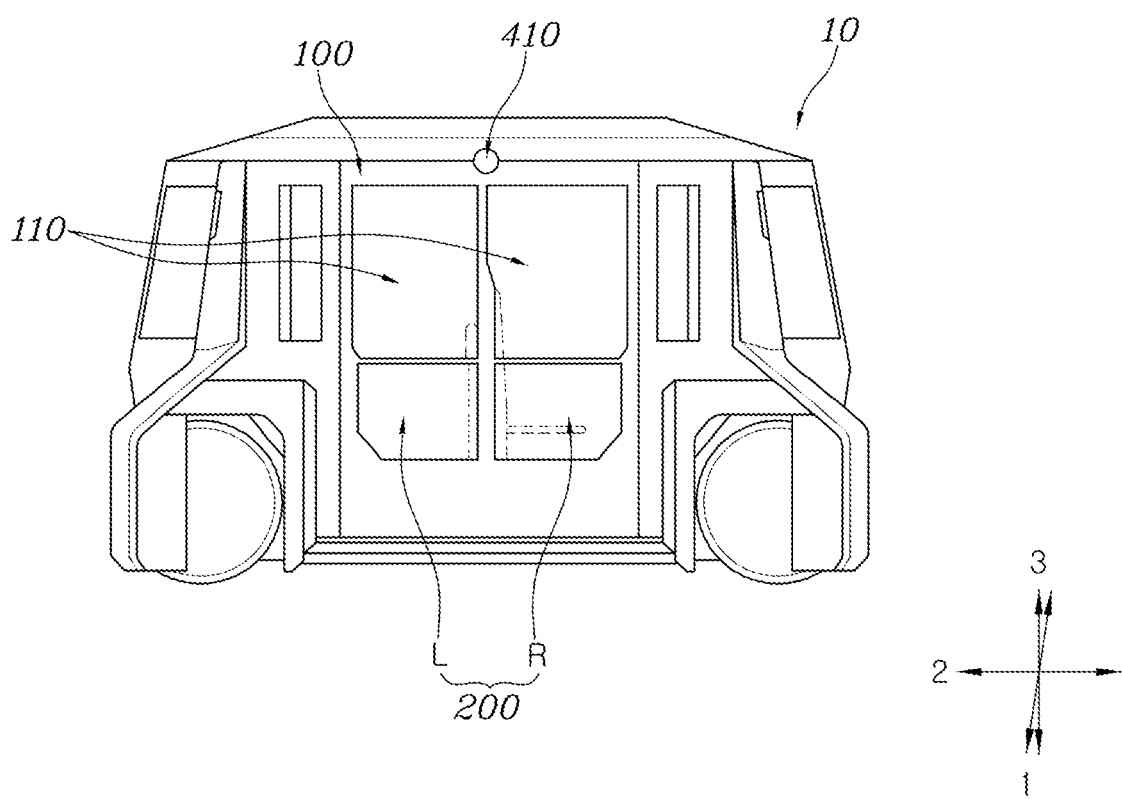
FIG. 2 is a view illustrating an appearance of autonomous mobility according to an embodiment of the present disclosure.

FIG. 2 is a view illustrating the appearance of autonomous mobility 10 according to an embodiment of the present disclosure.

FIG. 2 shows that the body of the autonomous mobility 10 extends in the direction of axis 2, and the door portion 100 may be disposed at the center of the body in the direction of axis 1. The display 200 is positioned at the bottom of the frame of the door portion 100, and the display 200 corresponding to a first region L may be inserted in the bottom-left of the frame while the display 200 corresponding to a second region R may be inserted in the bottom-right of the frame. A conventional window 110 may be inserted in the top-right and top-left of the frame of the door portion 100 to minimize the visibility obstruction caused by the display 200. The camera sensor 410 is attached to the top of the door portion 100 and forms a field of view in the direction of axis 1 so that the body temperature of an outside waiting passenger and the distance between the mobility and the outside passenger may be measured.

Figure 3:
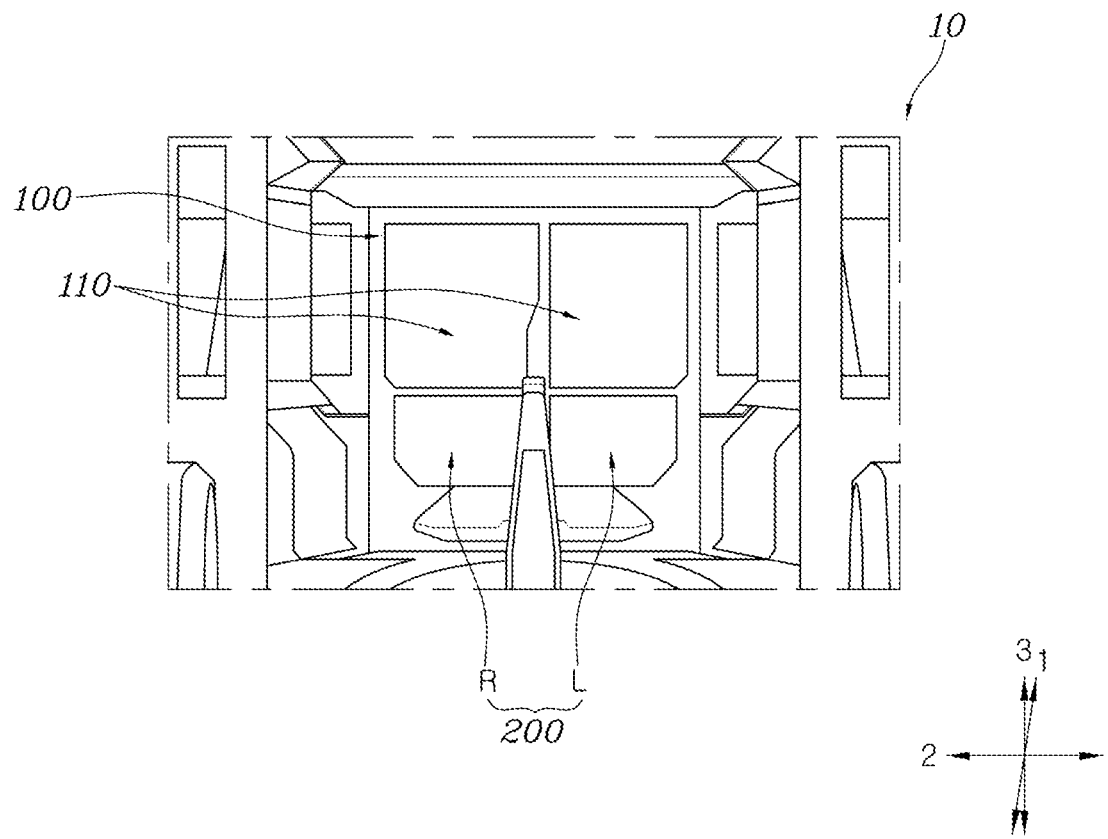
FIGS. 3 and 4 are views illustrating the inside of autonomous mobility viewed from different directions according to an embodiment of the present disclosure.
Figure 4:
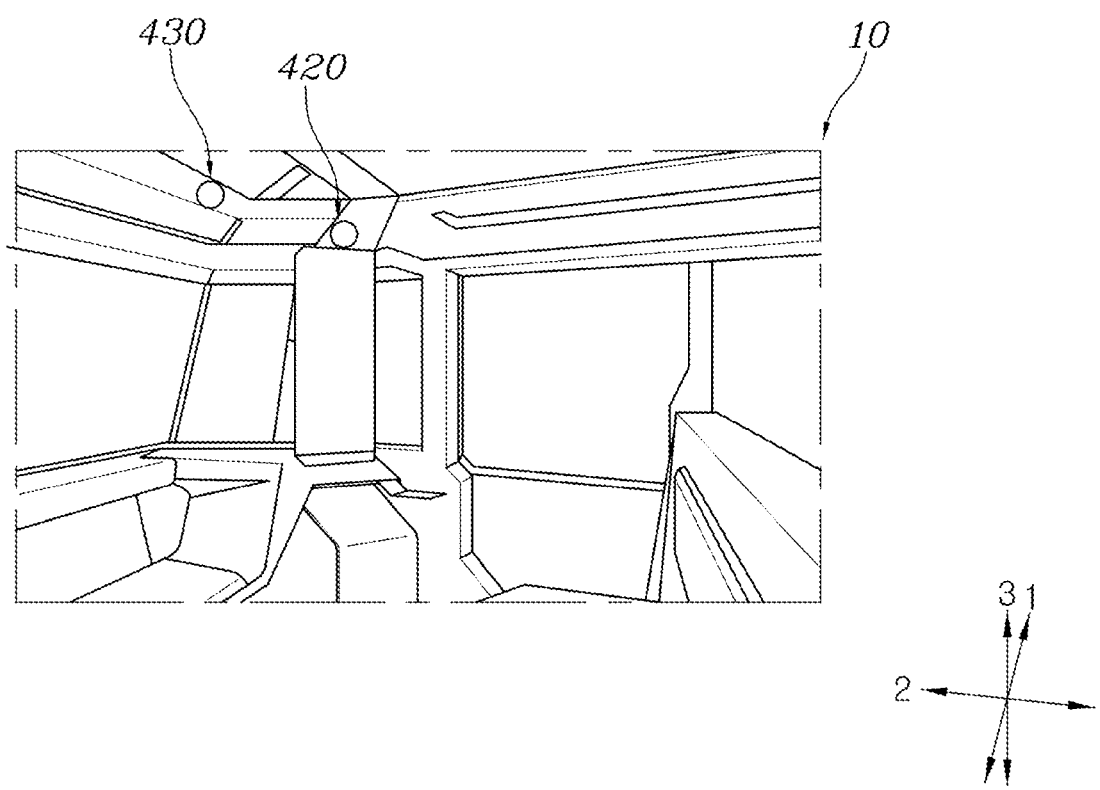

FIGS. 3 and 4 are views illustrating the inside of the autonomous mobility viewed from different directions. Referring to FIG. 3, it may be observed that the first region L and the second region R are reversed compared to FIG. 2. FIG. 4 shows the autonomous mobility may include the motion recognition sensor 420 and the gaze detection sensor 430 having a field of view over the inside of the vehicle.

Figure 5:
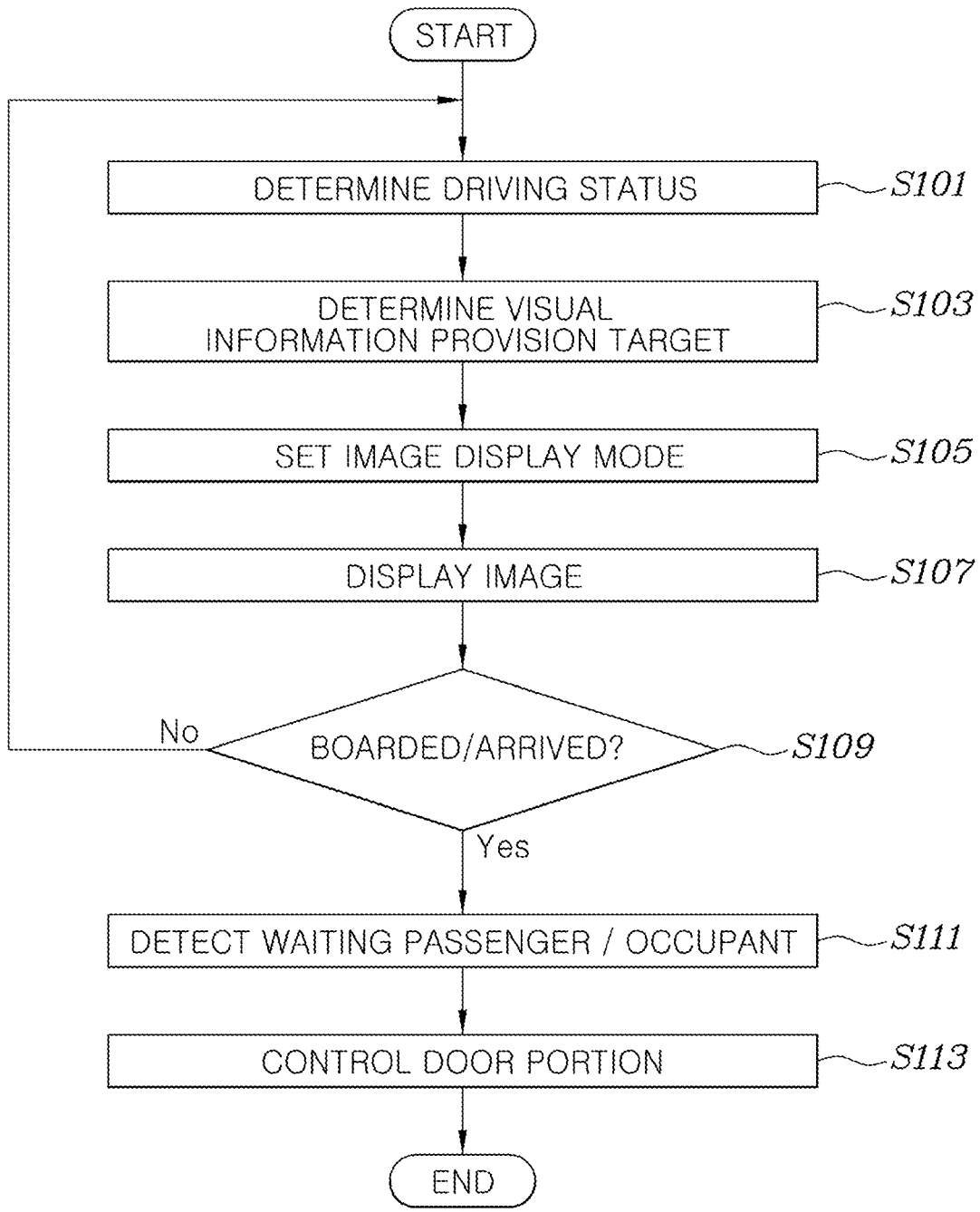
FIG. 5 is a flowchart of a control method of autonomous mobility according to an embodiment of the present disclosure.

FIG. 5 is a flowchart of a control method of autonomous mobility according to an embodiment of the present disclosure.

FIG. 5 shows that the mode setter 510 may determine the driving status of the autonomous mobility 10 based on the driving status information generated by the driving status information generation portion 300 (S101) and determine the visual information provision target of the image displayed on the display 200 to be at least one of the occupant and external object according to the determined driving status.

Then, the mode setter 510 may set the image display mode for the display 200 to adjust the forward orientation of the image according to the determined visual information provision target (S105). As described above, the image display mode may include the first and second display modes in which unidirectional visual information is provided to either the occupant or the external object and the third and fourth display modes in which bidirectional visual information is provided to both the occupant and the external object (S103).

The display controller 520 may select an image corresponding to the driving status and display the image on the display 200 after adjusting the forward orientation of the image selected according to the image display mode to the inward direction, outward direction, or both directions of the display 200 (S107).

When the driving status does not correspond to the outside waiting passenger's boarding process status or the occupant's arrival status (NO in S109) S101, S103, S105, and S107 may be performed again.

When the driving status corresponds to the outside waiting passenger's boarding process status or the occupant's arrival status (YES in S109), the sensing portion 400 may detect the status of the outside waiting passenger or occupant (S111). As described above, the camera sensor 410 attached to the exterior of the autonomous mobility 10 may measure the body temperature of the outside waiting passengers and the distance between the autonomous mobility 10 and the waiting passenger while the outside waiting passenger is in the onboarding process. The motion recognition sensor 420 and the gaze detection sensor 430 attached to the interior of the autonomous mobility may detect the gestures and gaze of the occupant of the autonomous mobility 10 when the occupant's destination is reached.

The door controller 530 may control the opening status of the door portion 100 based on the detection result of the sensing portion 400 (S113). More specifically, the door controller 530 may control the door portion 100 in the open state while the outside waiting passenger is in the onboarding process based on the detection result of the camera sensor 410 when the body temperature of the outside waiting passenger is within a predetermined range and the distance to the mobility is within a predetermined safe distance. Further, when the occupant's destination is reached, the door controller 530 may control the door portion 100 in the open state according to the gestures of the occupant recognized through the motion recognition sensor 420 and the gaze of the occupant recognized through the gaze detection sensor 430.

Figure 6A:
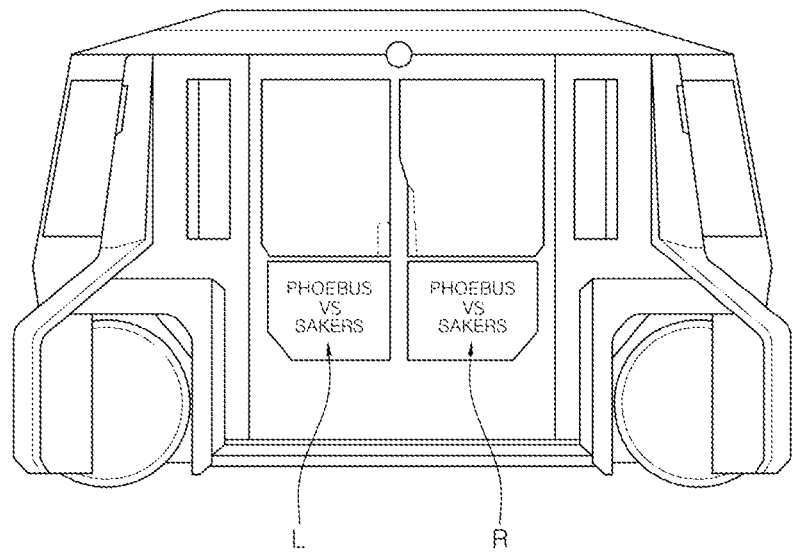
FIGS. 6A to 9B are views illustrating image display modes set differently according to the driving status of autonomous mobility according to an embodiment of the present disclosure.
Figure 6B:
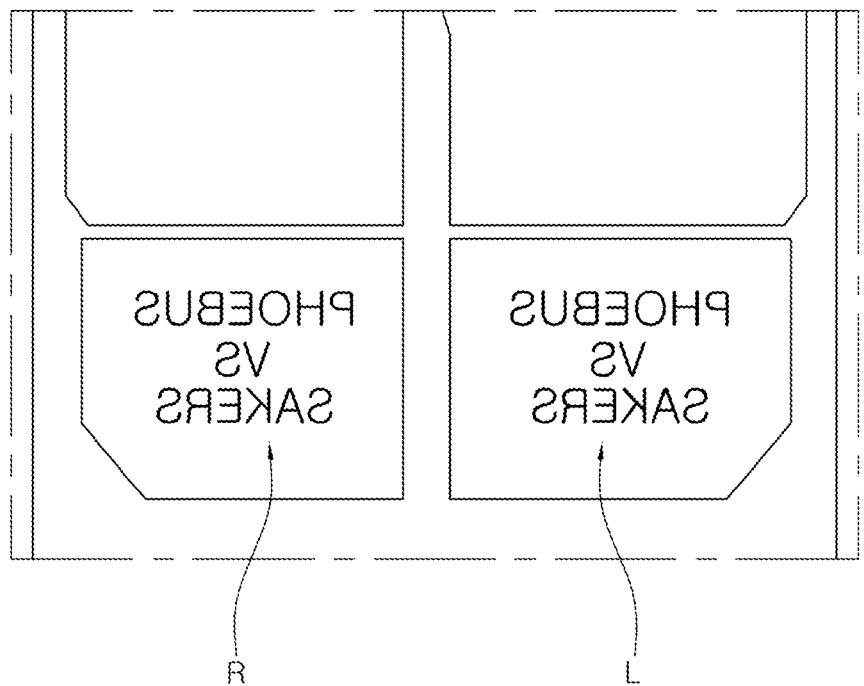

FIGS. 6A and 6B are views for describing the first display mode applied to the autonomous mobility 10 according to an embodiment of the present disclosure.

FIG. 6A shows that the image viewed from the outside of the display 200 is oriented forward in both the first region L and the second region R when the image display mode is set to the first display mode.

FIG. 6B shows that the image viewed from the inside of the display 200 is oriented reversely in both the first region L and the second region R when the image display mode is set to the first display mode.

Figure 7A:
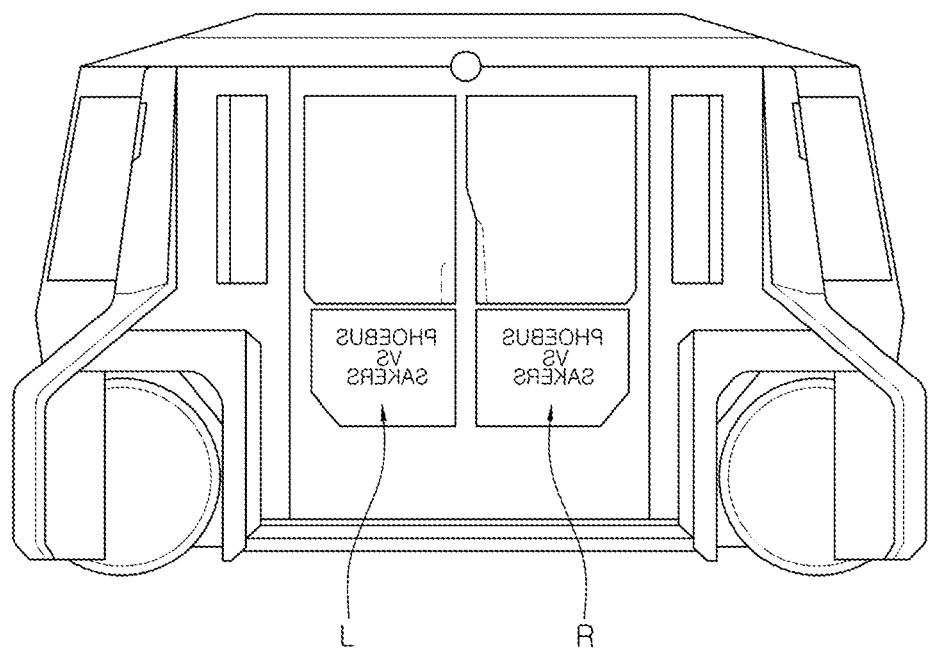
Figure 7B:
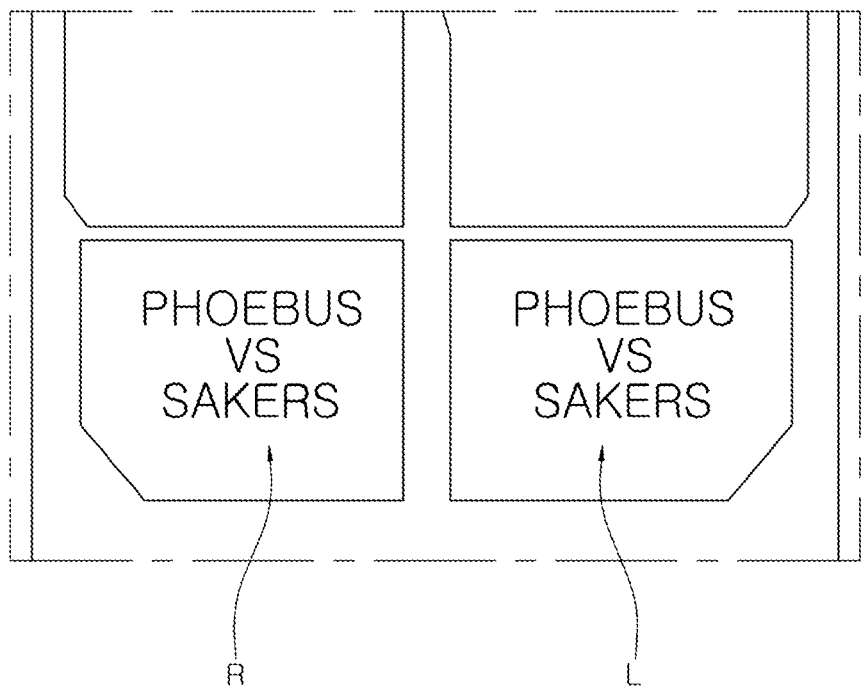

FIGS. 7A and 7B are views for describing the second display mode applied to the autonomous mobility 10 according to an embodiment of the present disclosure.

FIG. 7A shows that the image viewed from the outside of the display 200 is oriented reversely in both the first region L and the second region R when the image display mode is set to the second display mode.

FIG. 7B shows that the image viewed from the inside of the display 200 is oriented forward in both the first region L and the second region R when the image display mode is set to the second display mode.

Figure 8A:
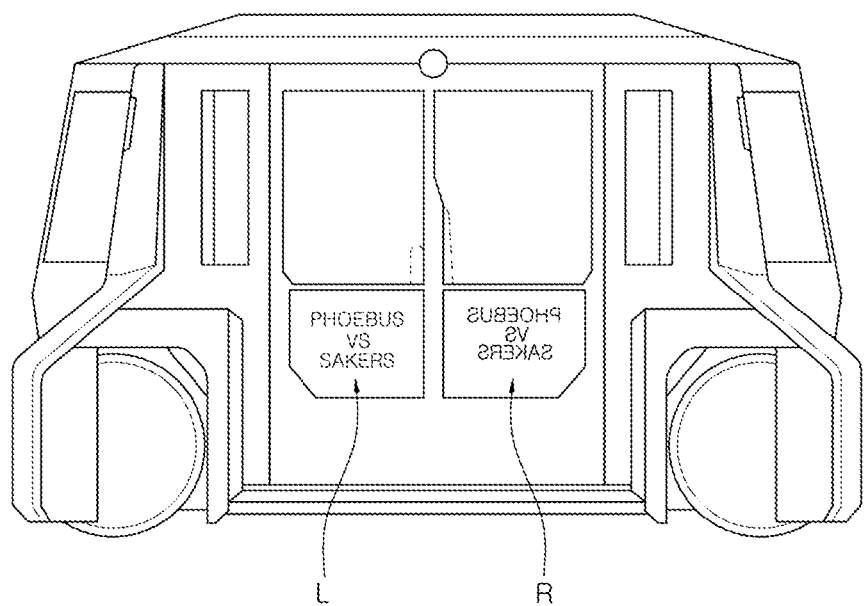
Figure 8B:
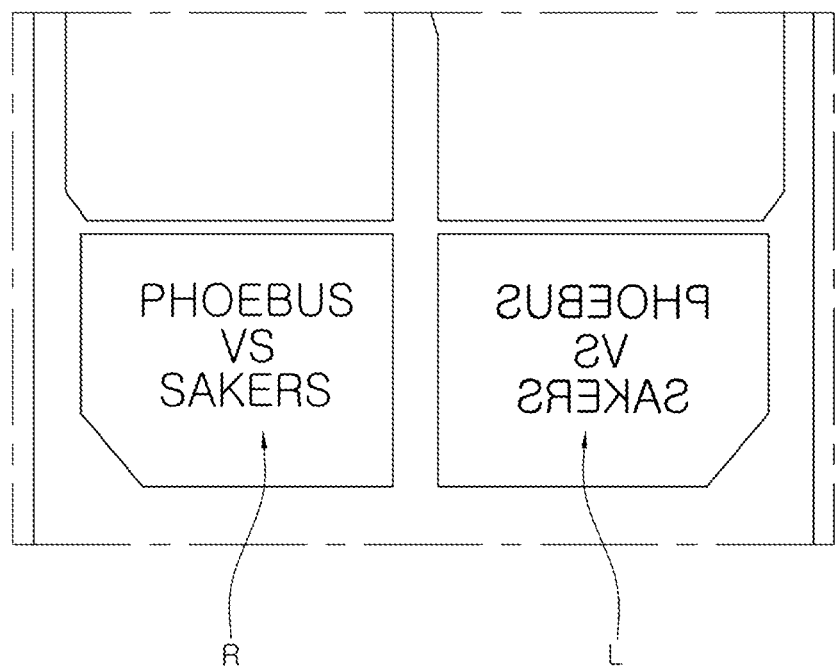

FIGS. 8A and 8B are views for describing the third display mode applied to the autonomous mobility 10 according to an embodiment of the present disclosure.

FIG. 8A shows that the image viewed from the outside of the display 200 is oriented forward in the first region L and reversely in the second region R when the image display mode is set to the third display mode.

FIG. 8B shows that the image viewed from the inside of the display 200 is oriented reversely in the first region L and forward in the second region R when the image display mode is set to the third display mode.

Figure 9A:
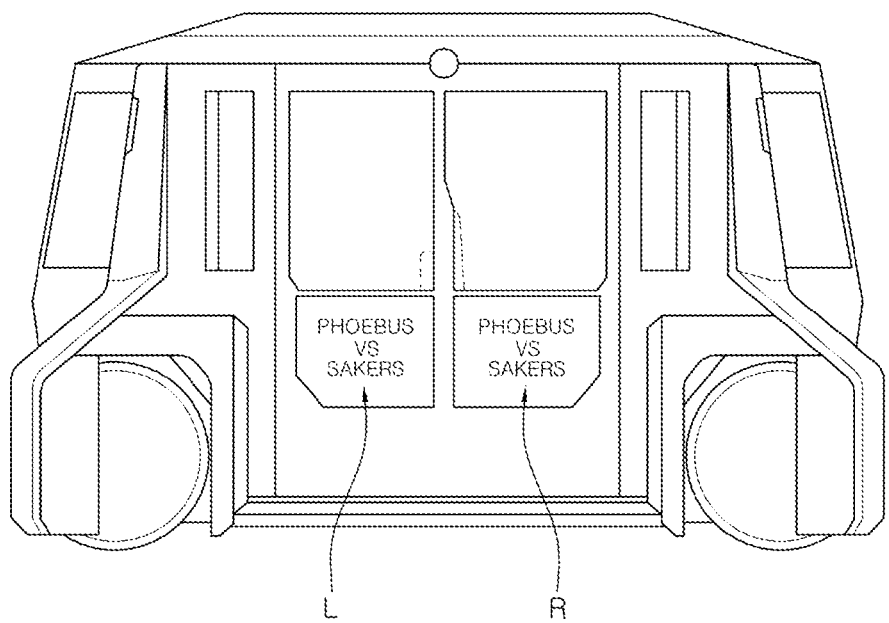
Figure 9B:
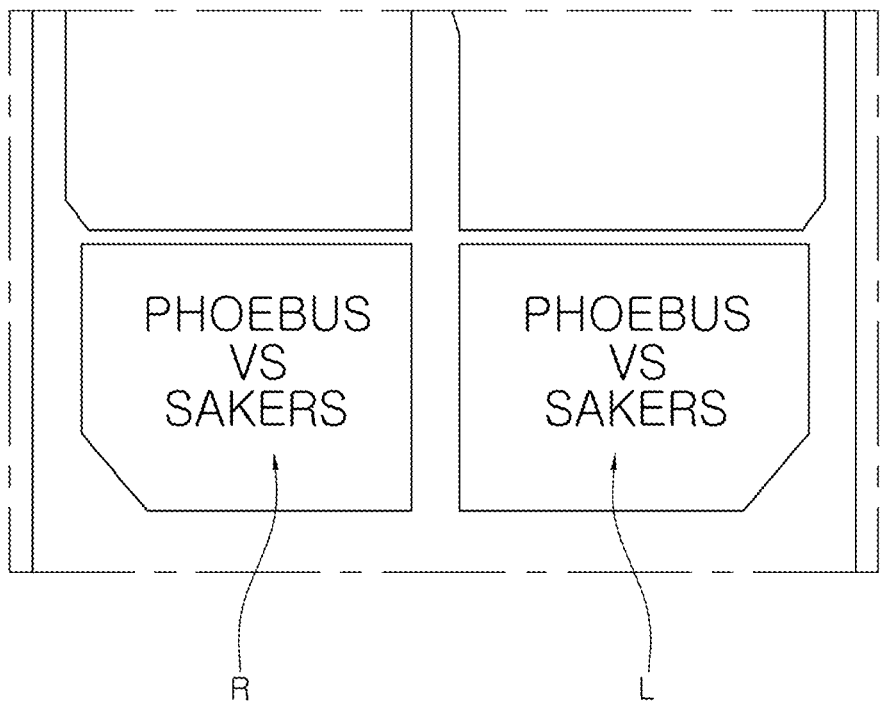

FIGS. 9A and 9B are views for describing the fourth display mode applied to the autonomous mobility 10 according to an embodiment of the present disclosure.

FIG. 9 shows that FIGS. 9A and 9B alternate at predetermined intervals in the fourth display mode.

FIG. 9A shows that the image viewed from the outside of the display 200 is oriented forward in both the first region L and the second region R during a first time period when the image display mode is set to the fourth display mode.

FIG. 9B shows that the image viewed from the inside of the display 200 is oriented forward in both the first region L and the second region R during a second time period when the image display mode is set to the fourth display mode.

Figure 10A:
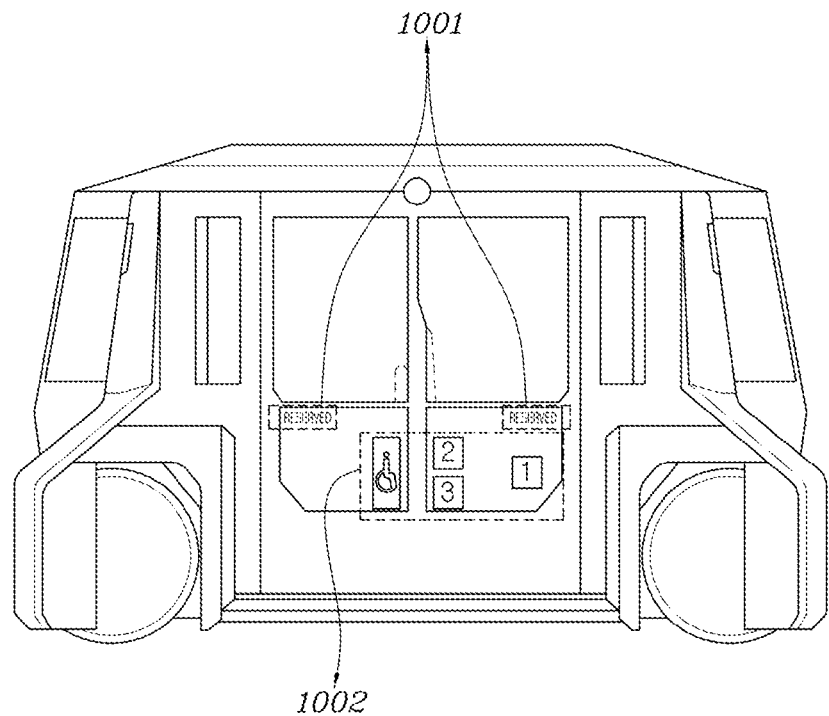
FIGS. 10A to 13B are views illustrating examples of images displayed on a display corresponding to the driving status of autonomous mobility according to an embodiment of the present disclosure.
Figure 10B:
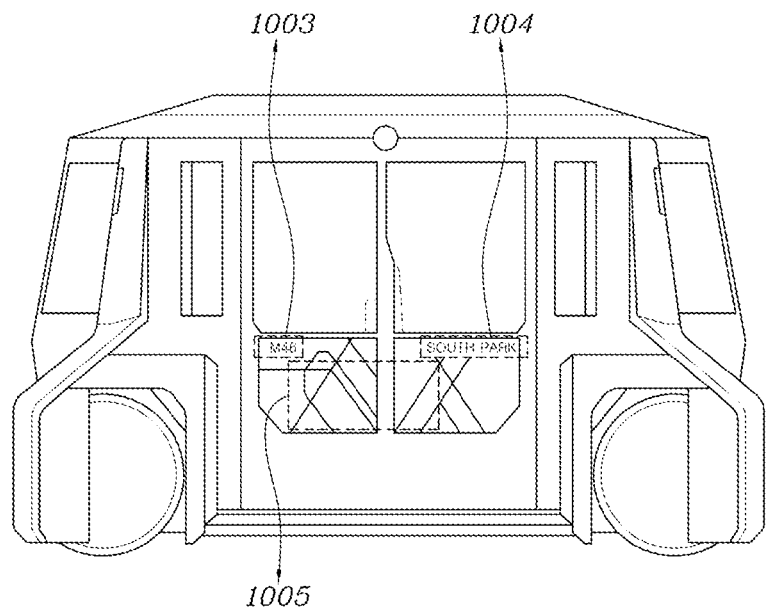

FIGS. 10A and 10B are views illustrating an example of an image displayed on a display corresponding to the outside waiting passenger's wait-for-boarding status in the autonomous mobility according to an embodiment of the present disclosure. In FIG. 10, the image display mode is set to the first display mode so that the image viewed from the outside of the display 200 can be adjusted into the forward orientation.

FIG. 10A shows that the display 200 may display an image about boarding guidance information content including reservation information 1001 and seating information 1002 when the driving status corresponds to the outside waiting passenger's wait-for-boarding status.

Further, FIG. 10B shows that the display 200 may display an image about boarding guidance information content including vehicle number 1003, destination 1004, and route to destination 1004 when the driving status corresponds to the outside waiting passenger's wait-for-boarding status.

FIGS. 11A to 11F are views illustrating an example of an image displayed on the display corresponding to the outside waiting passenger's boarding process status in the autonomous mobility according to an embodiment of the present disclosure. In FIG. 11, the image display mode is set to the first display mode so that the image viewed from the outside of the display 200 can be adjusted into the forward orientation.

Figure 11A:
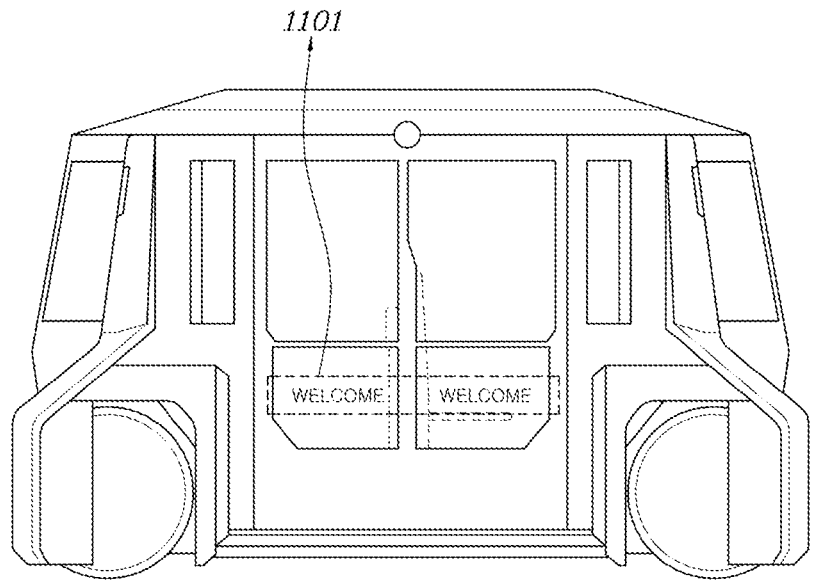
Figure 11B:
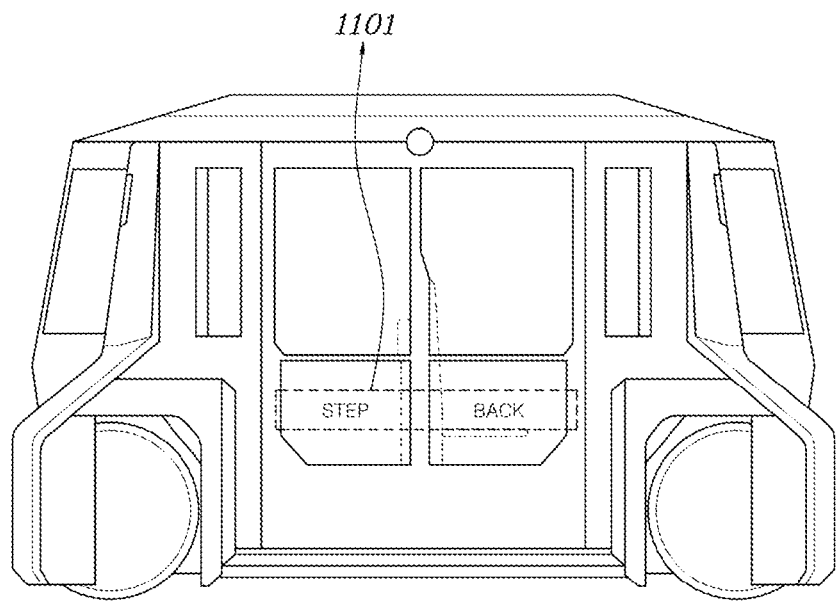

FIGS. 11A and 11B show that the display 200 may display an image about boarding process content including feedback 1101 about the safe distance through the camera sensor 410 positioned on the exterior of the autonomous mobility 10 when the driving status corresponds to the outside waiting passenger's boarding process status.

Figure 11C:
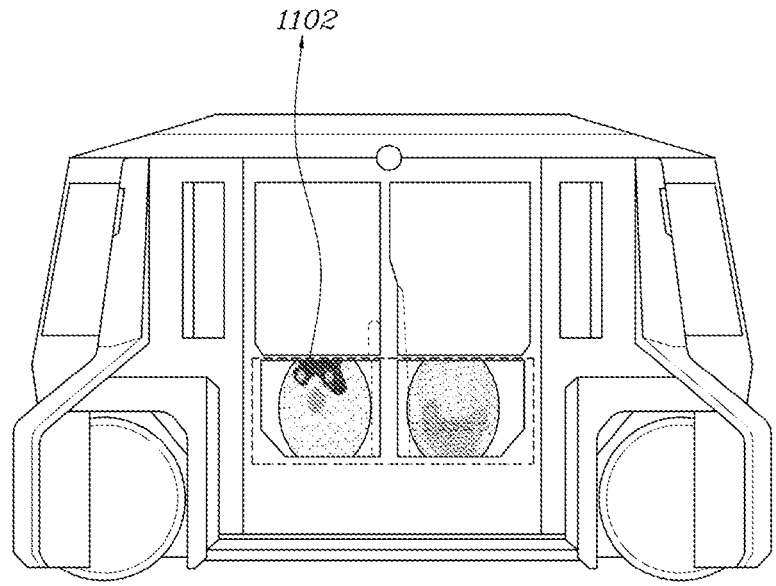
Figure 11D:
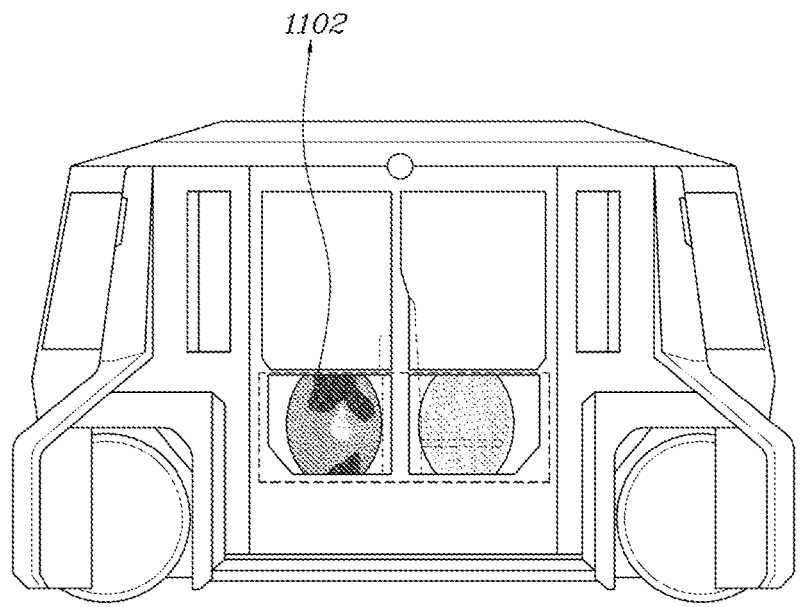

Then, FIGS. 11C and 11D show that the display 200 may display an image about boarding process content including body temperature information measured through the camera sensor 410 positioned on the exterior of the autonomous mobility 10.

Figure 11E:
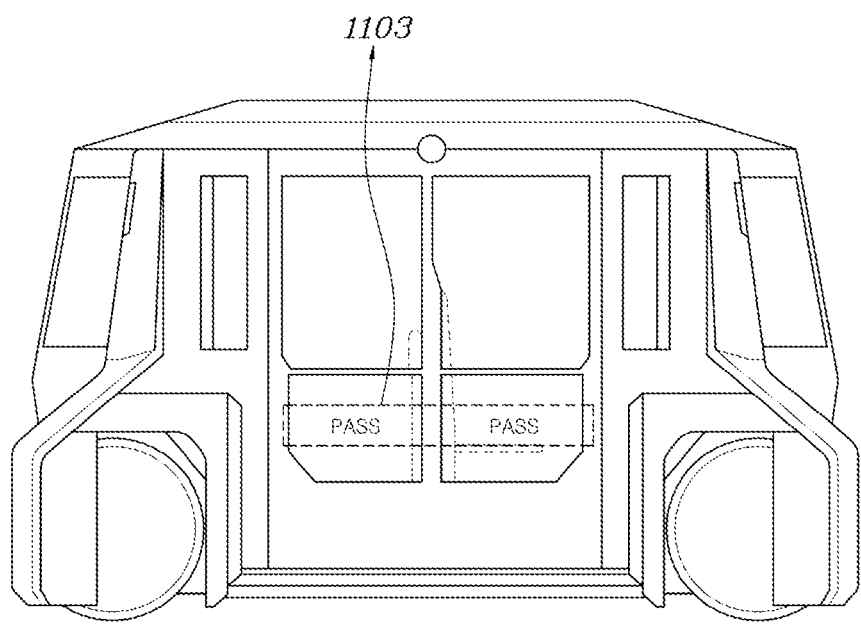
Figure 11F:
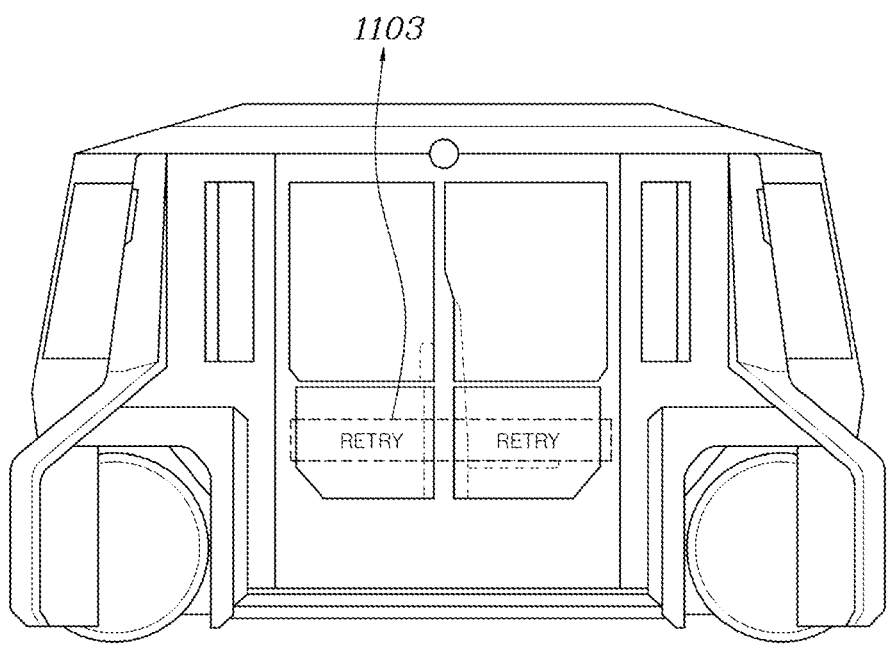

FIGS. 11E and 11F show that the display 200 may display an image about boarding process content including boarding-permitted or denied result 1103 based on whether the outside waiting passenger's body temperature is within a predetermined range and whether the distance to the mobility is within a predetermined safe distance. The door controller 530 may control the door portion 110 in the open state when boarding is permitted.

Figure 12A:
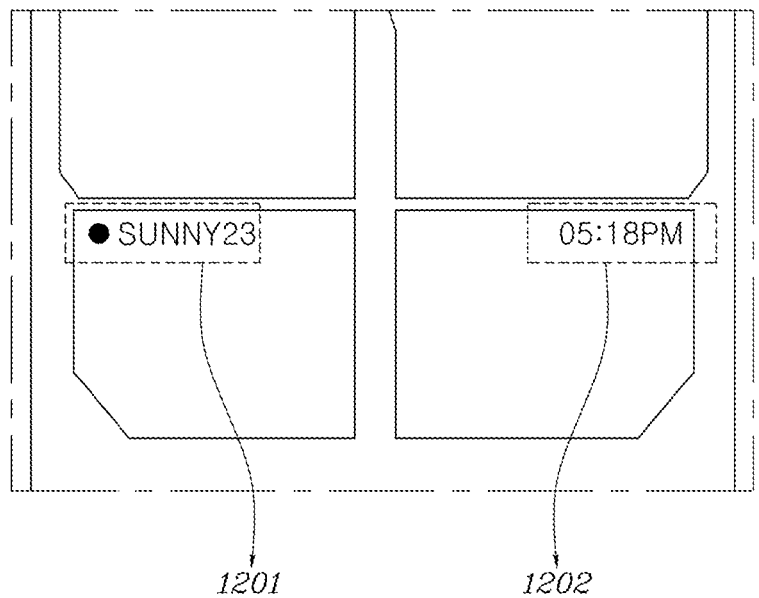
Figure 12B:
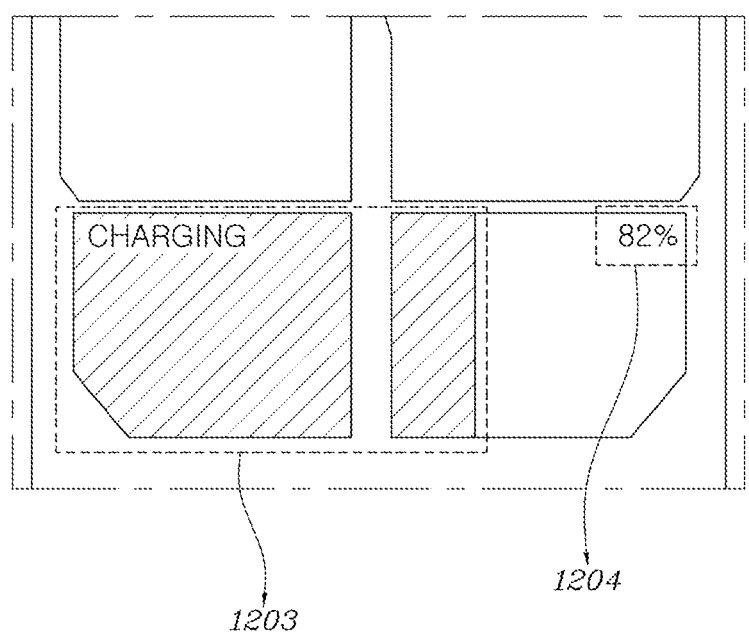

FIGS. 12A and 12B are views illustrating an example of an image displayed on the display corresponding to the occupant's moving-to-destination status. In FIG. 12, the image display mode is set to the second display mode so that the image viewed from the inside of the display 200 can be adjusted into the forward orientation.

FIG. 12A shows that the display 200 may display an image about driving status information content including weather and temperature information 1201 and time information 1202 when the driving status corresponds to the occupant's moving-to-destination status.

Further, FIG. 12B shows that the display 200 may show an image about driving status information content including a charge gauge bar 1203 and state of charge (SOC) 1204 when the driving status corresponds to the occupant's moving-to-destination status.

Figure 13A:
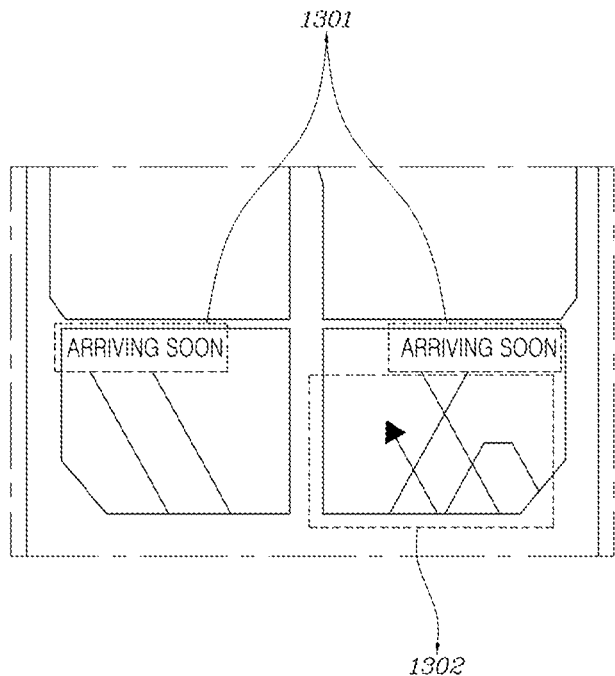
Figure 13B:
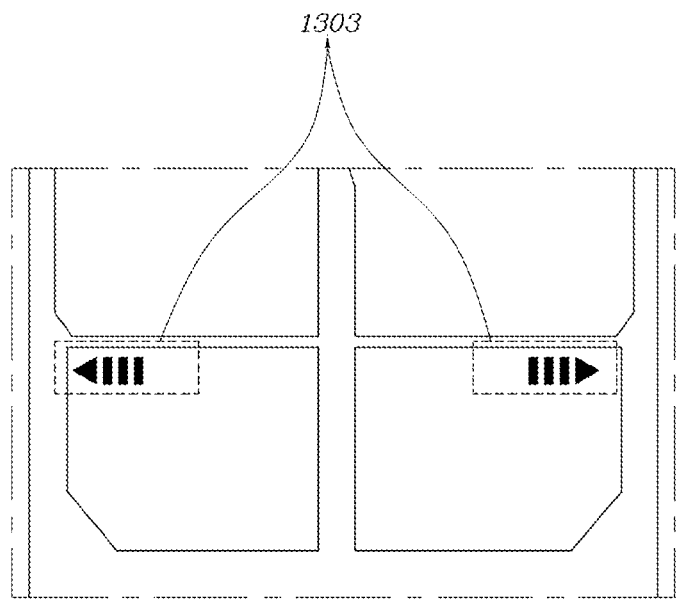

FIGS. 13A and 13B are views illustrating an example of an image displayed on the display corresponding to the occupant's arrival schedule status and arrival status in the autonomous mobility. In FIG. 13, the image display mode is set to the second display mode so that the image viewed from the inside of the display 200 can be adjusted into the forward orientation.

FIG. 13A shows that the display 200 may display an image about arrival notice information content including arrival schedule notice 1301 and route to destination 1302 when the driving status corresponds to the occupant's arrival schedule status.

FIG. 13B shows that the display 200 may display an image about gesture interaction content including a gesture notice 1301 when the driving status corresponds to the occupant's arrival status. Then, the motion recognition sensor 420 and gaze detection sensor 430 positioned inside the autonomous mobility 10 may detect the occupant's gestures and gaze, and the door controller 530 may control the door portion 100 in the open state according to the detection result.

The present disclosure described above can be implemented as a computer-readable code on a medium on which a program is recorded. The computer-readable medium includes all types of recording devices in which data that can be read by a computer system is stored. Examples of computer-readable media are a hard disk drive (HDD), a solid state disk (SSD), a silicon disk drive (SDD), ROM, RAM, CD-ROM, a magnetic tape, a floppy disk, an optical data storage device, and the like. Accordingly, the above-detailed description should not be construed as limiting in all aspects and should be considered illustrative. The scope of the disclosure is to be determined by the reasonable interpretation of the appended claims, and all changes within the equivalents of the present disclosure are included in the scope of the present disclosure.

What is claimed is:

1. A vehicle comprising:
    a display configured to variably display an image in one of an inward direction, an outward direction, and both directions;
    a mode setter programmed to determine a visual information provision target of an image displayed on the display according to driving status and programmed to set a forward orientation of the image on the display according to the visual information provision target; and
    a display controller programmed to select an image corresponding to the driving status and programmed to display the image on the display after adjusting the forward orientation of the selected image to the inward direction, the outward direction, or both directions of the display according to the forward orientation set by the mode setter.

2. The vehicle of claim 1, further comprising a door portion, wherein the display is implemented as a transparent window display surrounded by a frame provided in the door portion.

3. The vehicle of claim 2, wherein the mode setter is programmed to set the forward orientation of the image to outward direction of the display when the visual information provision target is determined to be an external object.

4. The vehicle of claim 3, wherein the mode setter is programmed to determine the visual information provision target to be the external object when the driving status corresponds to the external object's boarding process status.

5. The vehicle of claim 4, further comprising:
    a camera sensor positioned outside the door portion; and
    a door controller programmed to control the door portion in an open state according to a body temperature and distance of the external object based on a detection result of the camera sensor when the driving status corresponds to the external object's boarding process status.

6. The vehicle of claim 1, wherein the mode setter is programmed to determine the driving status based on driving status information, wherein the driving status information indicates at least one of wait-for-boarding status of an external object, the external object's boarding process status, an occupant's moving-to-destination status, an occupant's arrival schedule status, and an occupant's arrival status.

7. The vehicle of claim 6, wherein the mode setter is programmed to determine the forward orientation of the image to the inward direction of the display when the visual information provision target is determined to be an occupant.

8. The vehicle of claim 7, wherein the mode setter is programmed to determine the visual information provision target to be the occupant when the driving status corresponds to the occupant's arrival status.

9. The vehicle of claim 8, further comprising:
    a door portion;
    a motion recognition sensor positioned inside the door portion; and
    a door controller is programmed to control an opening status of the door portion according to an occupant's gestures recognized through the motion recognition sensor when the driving status corresponds to the occupant's arrival status.

10. The vehicle of claim 9, further comprising a gaze detection sensor positioned inside the door portion, wherein the door controller is programmed to control the door portion in an open state according to an occupant's gaze recognized through the gaze detection sensor.

11. The vehicle of claim 1, wherein the mode setter is programmed to set the forward orientation of the image to both directions of the display when the visual information provision target is determined to be an occupant and an external object, wherein the both directions include the inward direction and the outward direction.

12. The vehicle of claim 11, wherein the mode setter is programmed to set the forward orientation of the image in a first region of the display to the outward direction of the display and is programmed to set the forward orientation of the image in a second region of the display to the inward direction of the display when the forward orientation of the image is set to both directions of the display.

13. The vehicle of claim 1, wherein the mode setter is programmed to set the forward orientation of the image to switch between the outward and inward directions at predetermined time intervals when the visual information provision target is determined to be an occupant and an external object.

14. A method of controlling a vehicle, comprising:
    determining a driving status;
    determining a visual information provision target of an image displayed on a display according to the determined driving status;
    setting forward orientation of the image on the display according to the determined visual information provision target; and
    displaying the image on the display after adjusting the forward orientation of the image to an inward direction, an outward direction, or both directions of the display according to the set forward orientation,
    wherein the display is configured to variably display an image in one of an inward direction, an outward direction, and both directions.

15. The method of claim 14, wherein the determining is performed so that the visual information provision target is determined to be at least one of an occupant and an external object based on the determined driving status.

16. The method of claim 14, wherein the setting includes setting the forward orientation of the image to the outward direction of the display when the visual information provision target is determined to be an external object.

17. The method of claim 14, wherein the setting includes setting the forward orientation of the image to the inward direction of the display when the visual information provision target is determined to be an occupant.

18. The method of claim 14, wherein the setting includes setting the forward orientation of the image to be both directions of the display when the visual information provision target is determined to be an occupant and an external object, wherein the both directions include the inward and outward directions.

19. The method of claim 18, wherein the setting is performed so that the forward orientation of the image in a first region is set to the outward direction of the display and the forward orientation of the image in a second region is set to the inward direction of the display when the forward orientation of the image is determined to be both directions of the display.

20. A computer-readable recording medium on which a program for executing a vehicle control method according to claim 14 is recorded.

* * * * *